(12) United States Patent
Dec (10) Patent No.: US 12,173,793 B2
(45) Date of Patent: Dec. 24, 2024

(54) CAM-CONTROLLED CONTINUOUSLY VARIABLE TRANSMISSION SYSTEMS

(71) Applicant: GATES CORPORATION, Denver, CO (US)

(72) Inventor: Andrzej Dec, Rochester Hills, MI (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 18/126,653

(22) Filed: Mar. 27, 2023

(65) Prior Publication Data
US 2023/0313866 A1    Oct. 5, 2023

Related U.S. Application Data

(60) Provisional application No. 63/324,727, filed on Mar. 29, 2022.

(51) Int. Cl.
*F16H 9/14* (2006.01)
*B62M 9/16* (2006.01)

(52) U.S. Cl.
CPC ............... *F16H 9/14* (2013.01); *B62M 9/16* (2013.01)

(58) Field of Classification Search
CPC ...... F16H 61/66272; F16H 55/56; F16H 9/18; F16H 63/067
USPC .......................................................... 474/19
See application file for complete search history.

(56) References Cited

U.S. PATENT DOCUMENTS

| | | | | |
|---|---|---|---|---|
| 2,182,956 A * | 12/1939 | Beyerline | ............... | F16H 55/56 474/34 |
| 2,205,975 A * | 6/1940 | Heyer | ................. | F16H 57/0489 474/45 |
| 2,245,667 A * | 6/1941 | Heyer | ................... | F16H 63/067 474/39 |
| 2,651,208 A * | 9/1953 | Karig | ........................ | F16H 9/12 474/19 |
| 2,709,374 A * | 5/1955 | Williams | ............. | F16H 55/563 474/37 |
| 2,734,390 A * | 2/1956 | Thelander | ............... | F16H 55/56 474/37 |
| 2,751,790 A * | 6/1956 | Ingold | ....................... | F16H 9/16 474/46 |
| 2,941,412 A * | 6/1960 | Wrobbel | ................... | F16H 9/14 474/37 |
| 3,043,152 A * | 7/1962 | Karig | .................... | F16H 61/662 474/18 |
| 3,052,132 A * | 9/1962 | Karig | .................... | F16H 61/662 474/18 |
| 3,110,188 A * | 11/1963 | Gesche | .................. | F16H 13/14 474/31 |
| 3,110,189 A * | 11/1963 | Steuer | ...................... | F16H 9/16 474/18 |

(Continued)

*Primary Examiner* — Henry Y Liu
(74) *Attorney, Agent, or Firm* — Kevin J. Aiken, Esq.

(57) ABSTRACT

An arrangement for balancing axial forces in driver and driven clutches of a continuously variable transmission system that may include but is not limited to a pulley, a sheave mechanism, a driver clutch mechanism, or driver clutch, a driven pulley mechanism, a driven clutch mechanism, or driven clutch, and a shifting mechanism, servo, actuator mechanism, or actuator. The torque transmitted by the continuously variable transmission system is converted to axial forces acting upon belt. The forces in driver and driven clutches are balanced to minimize the force required for speed changes by shifting mechanism.

7 Claims, 11 Drawing Sheets

(56) References Cited

U.S. PATENT DOCUMENTS

| | | | | |
|---|---|---|---|---|
| 3,490,301 A * | 1/1970 | Steuer | F16H 9/16 | 474/31 |
| 3,705,517 A * | 12/1972 | Yamanaka | F16H 9/16 | 474/43 |
| 3,861,228 A * | 1/1975 | Adams | F16H 61/6625 | 474/46 |
| 4,116,080 A * | 9/1978 | Berens | F16H 9/20 | 474/31 |
| 4,119,326 A * | 10/1978 | Porter | B62M 9/06 | 474/37 |
| 4,223,771 A * | 9/1980 | Petersen | F16D 67/02 | 474/37 |
| 4,380,444 A * | 4/1983 | Dolza | F16H 9/12 | 474/30 |
| 4,523,917 A * | 6/1985 | Schildt | F16H 61/6625 | 474/19 |
| 4,869,706 A * | 9/1989 | Miyata | F16H 9/18 | 474/70 |
| 4,969,856 A * | 11/1990 | Miyata | F16H 9/18 | 474/11 |
| 5,045,028 A * | 9/1991 | Rattunde | F16H 61/66259 | 474/19 |
| 5,462,492 A * | 10/1995 | Miyata | F16H 37/0846 | 474/1 |
| 5,662,538 A * | 9/1997 | Wang | F16H 55/56 | 474/11 |
| 5,848,949 A * | 12/1998 | Miyata | F16H 37/0846 | 475/210 |
| 6,203,458 B1 * | 3/2001 | Chang | B23Q 5/162 | 408/128 |
| 6,379,274 B1 * | 4/2002 | Robert | F16H 61/66272 | 474/8 |
| 6,569,043 B2 * | 5/2003 | Younggren | F16H 55/56 | 474/19 |
| 6,669,588 B2 * | 12/2003 | Schmid | F16H 61/66272 | 474/21 |
| 6,743,129 B1 * | 6/2004 | Younggren | F16H 55/56 | 474/19 |
| 6,755,759 B2 * | 6/2004 | Blanchard | F16H 61/66272 | 474/37 |
| 6,786,844 B2 * | 9/2004 | Fritzer | F16H 59/16 | 475/213 |
| 7,207,920 B2 * | 4/2007 | Jonsson | F16H 63/062 | 477/44 |
| 7,264,564 B2 * | 9/2007 | Walter | F16H 55/56 | 474/18 |
| 7,351,169 B2 * | 4/2008 | Jonckheere | A01F 12/56 | 474/18 |
| 7,641,580 B2 * | 1/2010 | Blanchard | A01D 34/6806 | 474/1 |
| 8,187,127 B2 * | 5/2012 | Ishida | F16H 55/56 | 474/33 |
| 9,005,058 B2 * | 4/2015 | Ouchida | F16H 61/66272 | 474/19 |
| 9,933,053 B2 * | 4/2018 | Yoshimura | F16H 63/06 | |
| 10,054,202 B2 * | 8/2018 | Yokoyama | F16H 61/66272 | |
| 10,711,888 B2 * | 7/2020 | Tardif-Leblanc | F16H 61/662 | |
| 11,592,100 B2 * | 2/2023 | Bonham | F16H 63/062 | |
| 2002/0011148 A1 * | 1/2002 | Weissflog | F16H 63/067 | 91/418 |
| 2002/0183145 A1 * | 12/2002 | Blanchard | F16H 61/6625 | 474/19 |
| 2004/0043848 A1 * | 3/2004 | Nouis | F16H 63/067 | 474/19 |
| 2004/0063524 A1 * | 4/2004 | Zulawski | F16H 55/56 | 474/19 |
| 2004/0092345 A1 * | 5/2004 | Borghi | F16H 55/56 | 474/19 |
| 2004/0142781 A1 * | 7/2004 | Huddleston | F16H 61/66272 | 474/19 |
| 2004/0229723 A1 * | 11/2004 | Kalies | F16H 63/067 | 474/12 |
| 2004/0266570 A1 * | 12/2004 | Kalies | F16H 63/067 | 474/19 |
| 2005/0209032 A1 * | 9/2005 | Aitcin | F16H 55/56 | 474/19 |
| 2005/0239585 A1 * | 10/2005 | Nishida | F16H 55/56 | 474/37 |
| 2005/0277502 A1 * | 12/2005 | Wood | F16H 63/062 | 474/19 |
| 2007/0026981 A1 * | 2/2007 | Blanchard | F16H 61/66272 | 474/37 |
| 2007/0093324 A1 * | 4/2007 | Pritchett | F16H 63/067 | 474/23 |
| 2007/0105671 A1 * | 5/2007 | Binello | F16H 55/56 | 474/19 |
| 2012/0100944 A1 * | 4/2012 | Gu | F16H 63/062 | 474/46 |
| 2013/0150190 A1 * | 6/2013 | Ishino | F16H 55/56 | 474/8 |
| 2014/0315670 A1 * | 10/2014 | Mariotti | F16H 55/563 | 474/12 |
| 2015/0024882 A1 * | 1/2015 | Ochab | F16H 63/067 | 474/19 |
| 2016/0290450 A1 * | 10/2016 | Itagaki | F16H 9/18 | |
| 2017/0114875 A1 * | 4/2017 | Yoshimura | F16H 63/06 | |
| 2019/0011024 A1 * | 1/2019 | Cheng | F16H 57/0487 | |
| 2019/0285150 A1 * | 9/2019 | Zurbruegg | F16D 23/12 | |
| 2020/0173534 A1 * | 6/2020 | O'Reilly | F16H 61/66272 | |

* cited by examiner

CAM-CONTROLLED CONTINUOUSLY VARIABLE TRANSMISSION SYSTEMS

TECHNICAL FIELD

The present application relates to continuously variable transmission controlled through the use of a cam system for balancing axial forces in driver and driven clutches and systems and methods of making the same. More specifically the present application relates to CVT cam-controlled systems for automotive, industrial, and personal mobility, such as bicycles, and the like applications.

BACKGROUND OF THE INVENTION

In many applications utilizing a driven sprocket and a driver sprocket or crankshaft the ability to change gear ratios is unavailable or complicated having to utilize individual sprockets of varying sizes and a system to move the chain or belt from each sprocket, such as a derailleur, to change the gear ratio. This can be costly, add complexity to the system, and make for additional failure points within the system. It is also difficult to optimize the drive system for multiple ranges of operating conditions.

Embodiments of the present invention do not rely on multiple sprockets and a derailleur to change the gear ratio. Instead, embodiments described herein have sets of sheaves joined by a belt that continuously moves among a potentially infinite number of speed ratios, which allow a user to specifically choose the optimal speed ratio for the current operating conditions. A "speed ratio" describes the relative mechanical advantage between sets of sheaves and is akin to a gear ratio.

However, in conventional continuously variable transmissions, there is a high amount of torque produced in the system which requires a large amount of force to change the speed ratio. The present invention utilizes a cam-controlled actuator to balance the forces in the driver and driven clutches to minimize the force required to change the speed ratio. By balancing the forces in the driven and driver clutched the axial forces acting upon the belt from the transmitted torque are also reduced, which may lead to increased belt life and decreased belt noise.

SUMMARY OF THE INVENTION

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

The present disclosure is directed to continuously variable transmissions such as for use with automobiles, e-bikes, and other personal mobility systems such as standard bicycles, wheelchairs, scooters including electric scooters, motorcycles, and other systems that utilize a belt for transmitting power to impart motion to the system. The present disclosure provides a system for balancing axial forces in driver and driven clutches utilizing a cam-controlled continuously variable transmission system.

These and other aspects of the technology described herein will be apparent after consideration of the Detailed Description and Figures herein. It is to be understood, however, that the scope of the claimed subject matter shall be determined by the claims as issued and not by whether the given subject matter addresses any or all issues noted in the Background or includes any features or aspects recited in the Summary.

BRIEF DESCRIPTION OF THE DRAWINGS

Non-limiting and non-exhaustive embodiments of the disclosed technology are described with reference to the following figures, wherein like reference numerals refer to like parts throughout the various views unless otherwise specified.

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

| | | |
|---|---|---|
| A1 - angle | FR2 - force radial | S51 - side of slot |
| A2 - angle | FX2 - force axial | S52 - side of slot |
| SA - angle | TFX1 - total axial force | S53 - side of slot |
| SA1 - angle | TFX2 - total axial force | 2 - shaft |
| SA2 - angle | BF - belt force | 4 - driver sleeve |
| AX - axis of rotation | BFX1 - belt axial force | 8 - fixed sheave |
| AX1 - axis | BFX2 - belt axial force | 10 - movable sheave |
| AX2 - axis | R - cam radius | 12 - pin |
| D1 - direction of rotation | S1 - slot | 12X - axis |
| D3 - direction | S2 - slot | 14 - bearing |
| FN1 - force normal | S3 - slot | 16 - carrier |
| FR1 - force radial | S4 - slot | 16B - carrier |
| FX1 - force axial | S3B - slot start | 16C - cavity |
| FN2 - force normal | S5 - slot | 18 - retaining ring |
| 20 - bushing/bearing | 34 - sheave fixed | 42 - actuator arm |
| 22 - retaining ring | 36 - shaft output | 43 - shaft |
| 24 - O-Ring/sealing ring | 36B - flange | 44 - link |
| 30 - speed sensor | 38 - spring | 46 - housing |
| 32 - sheave movable | 39 - driven sleeve | 48 - bolt |
| 33 - pin | S39 - slot | 50 - belt |
| 33X - axis | 40 - actuator | 52 - eccenter |

DETAILED DESCRIPTION

As indicated above, the present description provides relates to continuously variable transmission controlled through the use of a cam system for balancing axial forces in driver and driven clutches and systems and methods of making the same. The present application More specifically the present application relates to CVT cam-controlled systems for automotive, industrial, and personal mobility, such as bicycles, and the like applications.

In the following description, reference is made to the accompanying drawing that forms a part hereof and in which is shown by way of illustration at least one specific implementation. The following description provides additional specific implementations. These embodiments are disclosed in sufficient detail to enable those skilled in the art to practice the invention. It is to be understood that other implementations are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples, including the figures, provided below. In some instances, a reference numeral may have an associated sub-label consisting of a lower-case letter to denote one of multiple similar components. When reference is made to a reference numeral without specification of a sub-label, the reference is intended to refer to all such multiple similar components.

Figure 1:
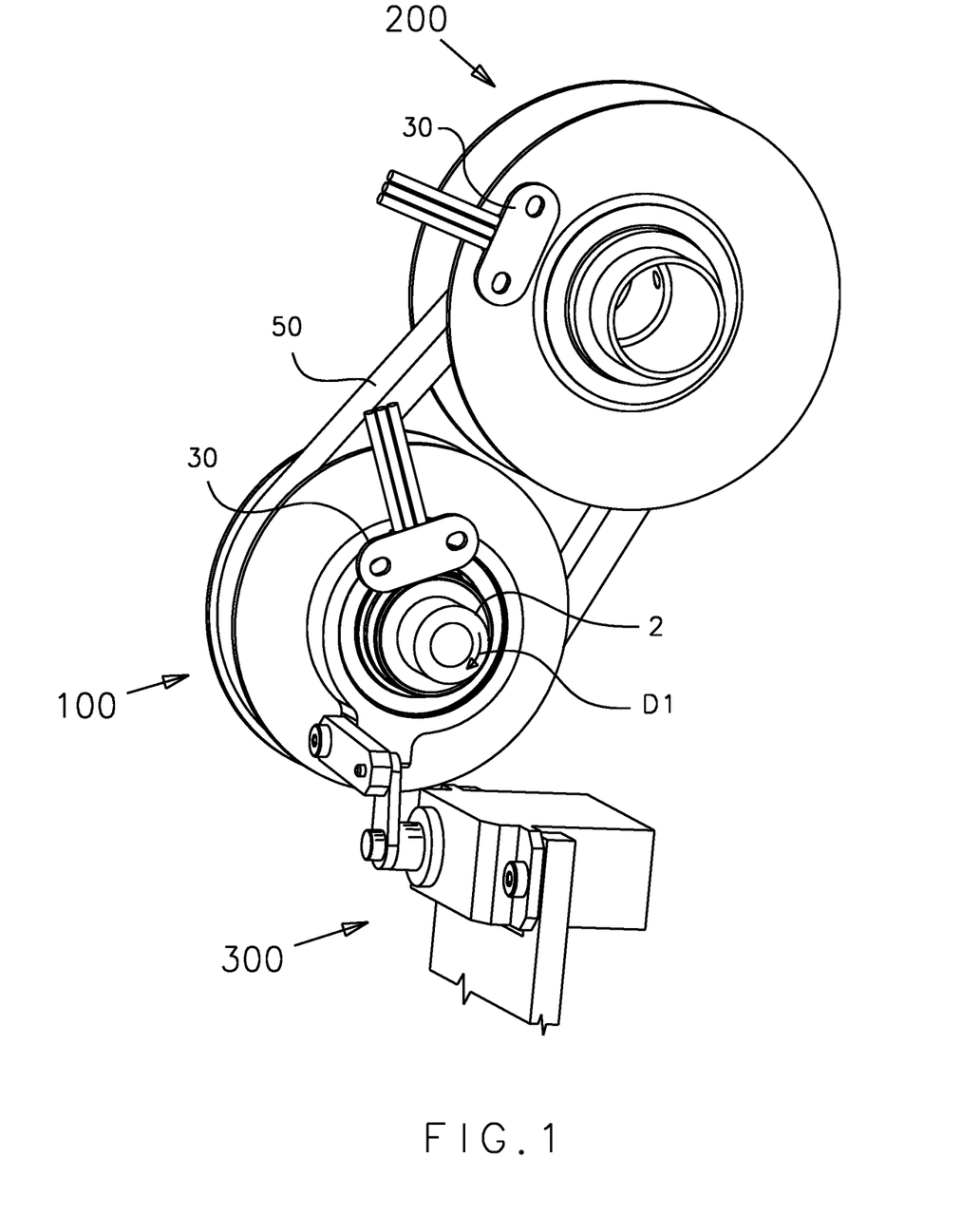
FIG. 1 is a rear isometric view of an exemplary embodiment of the cam-controlled continuously variable transmission system.
Figure 2:
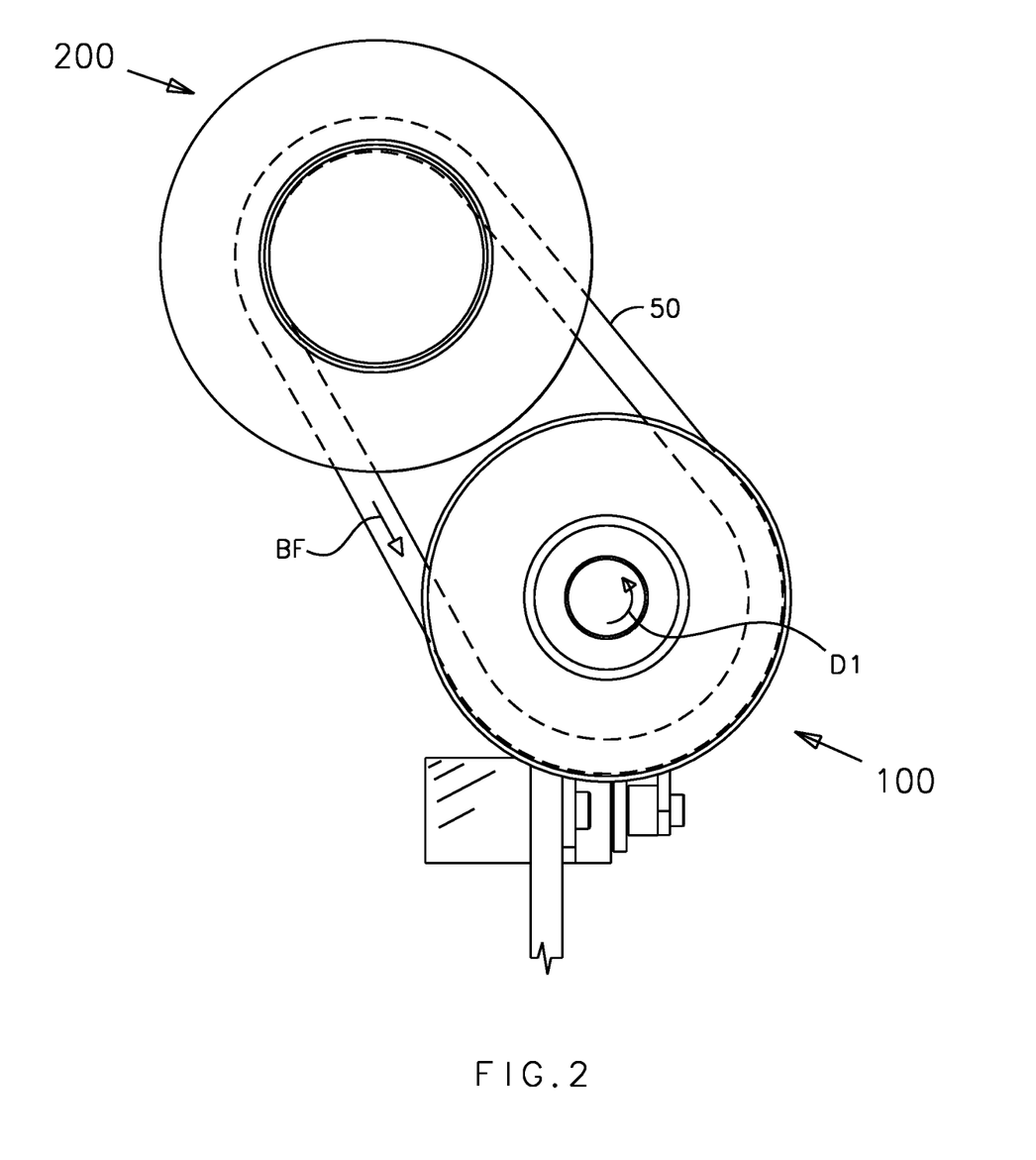
FIG. 2 is a front view of an exemplary embodiment of the cam-controlled continuously variable transmission system.
Figure 3:
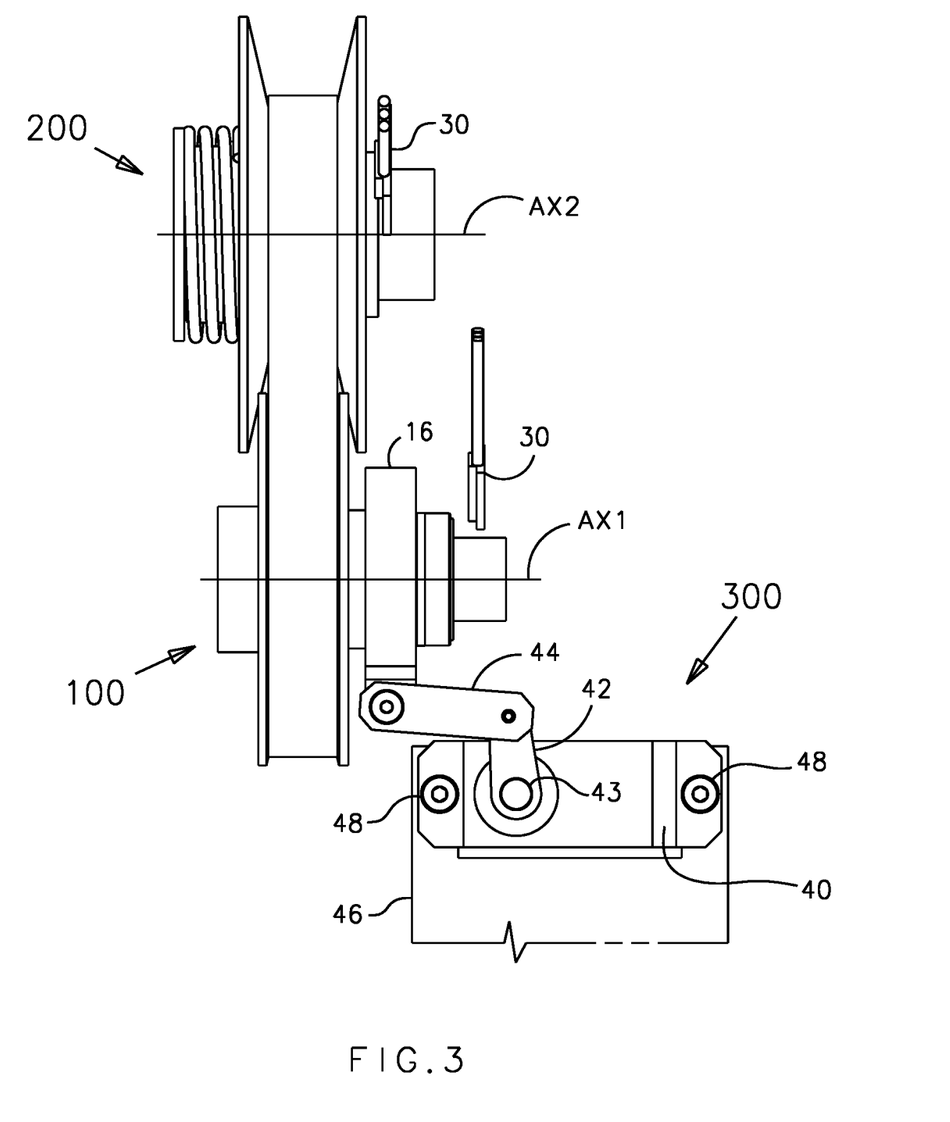
FIG. 3 is a side view of an exemplary embodiment of the cam-controlled continuously variable transmission of this invention

As shown in FIGS. 1, 2, and 3 one embodiment of the continuously variable transmission system or CVT system, may include but is not limited to at least one pulley, at least one sheave mechanism, a driver clutch mechanism, or driver clutch 100, a driven pulley mechanism, a driven clutch mechanism, or driven clutch 200, and a shifting mechanism, servo, actuator mechanism, or actuator 300.

In some embodiments, the driver clutch 100 may be connected with driven clutch 200 via a belt 50. The belt 50 may be of the type of an endless belt, a segmented belt, or the like. The belt 50 may transmit power from the driver clutch to the driven clutch. Speed sensors 30 are fixedly attached to the housing 46 (attachment not shown) to monitor the rotational speed of the driven and driver clutches.

Figure 4:
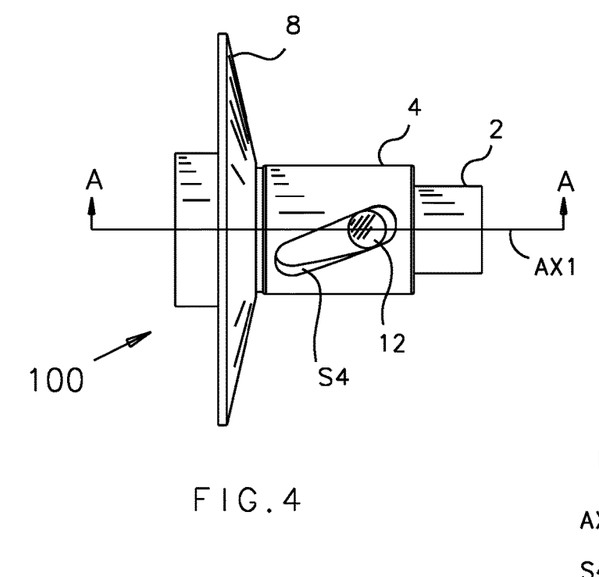
FIG. 4 is a side view of an exemplary embodiment of the driver clutch less movable sheave, less bearing and bearing carrier.
Figure 5:
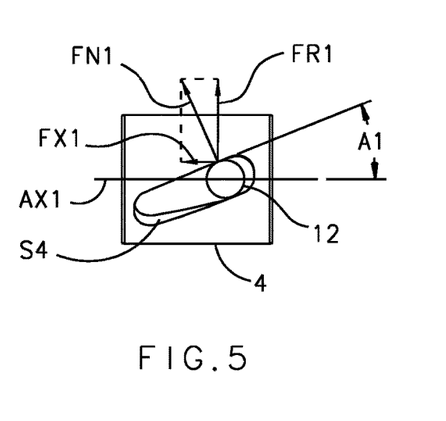
FIG. 5 is a side view of a sleeve with slot and pin of driver clutch mechanism showing force distribution.
Figure 6:
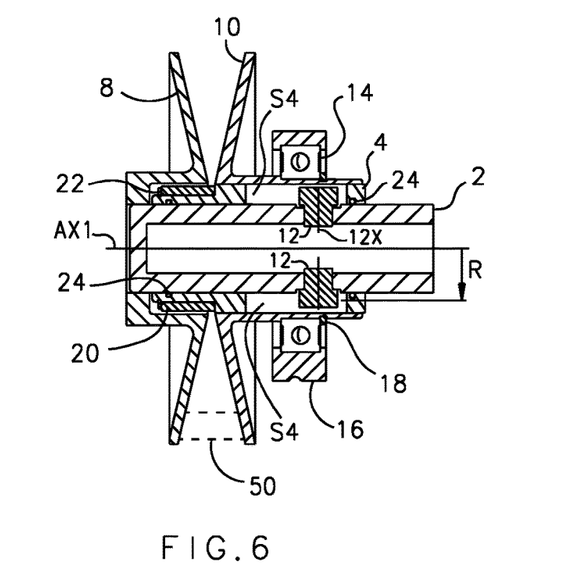
FIG. 6 is a section view of driver clutch mechanism from FIG. 4 taken along line A-A including movable sheave, bearing and bearing carrier.

In some embodiments, as shown if FIGS. 4, 5, and 6, the driver clutch 100 may include but is not limited to an input shaft or driver shaft 2, a fixed sheave 8 fixedly attached to shaft 2, in some embodiments, this may be accomplished by utilizing a press fit, a driver sleeve 4 movably journaled to shaft 2, a round pin 12 rotatably journaled to a hole in shaft 2 with its upper portion loosely engaging slot S4 formed in driver sleeve 4. In another embodiment (not shown), the pin may be substituted with a roller. In yet another embodiment (not shown), the pin may be substituted with a slider.

Sealing rings 24, such as but not limited to O-rings, sit in grooves formed on the inside diameter of driver sleeve 4 positioned close to each end of driver sleeve 4. The sealing rings prevent grease (not shown) that may fills slots S4 from purging outside which may cause accelerated wear of the system.

A movable second driver sheave 10 is fixedly attached to driver sleeve 4 so it moves in unison with driver sleeve 4. Inside diameter of a thrust bearing 14 is fixedly attached to an outside diameter of a stem of movable second driver sheave 10. A retaining ring 18 prevents bearing 14 from sliding out of movable second driver sheave 10. A carrier 16 is fixedly attached to the outside diameter of bearing 14. In one embodiment, bearing 14 may be a ball bearing type bearing, but may also be a roller or needle type bearing. In yet other embodiments bearing 14 may be a coated busing configured to act as a ball bearing would.

Driver shaft 2, the fixed first driver sheave 8, movable second driver sheave 10, driver sleeve 4, and pins 12 may be made of steel alloys, however, in some embodiments, these components may be manufactured from other metals such as aluminum alloys titanium alloys; polymers such as but not limited to ABS or HDPE; or composite materials, such as but not limited to carbon fiber reinforced composites. In some embodiments, two pins 12 spaced approximately 180 degrees apart may be beneficial. In other embodiments, more pins and corresponding slots may be used to transmit high torque in applications where this is needed.

As shown in FIG. 6, bearing 20 is rotatably journaled over the driver sleeve 4 and is prevented from sliding out of the driver sleeve 4 by a retaining ring 22. The bearing 20 may be a roller bearing, needle bearing, or polymer, composite, or metal bushing. The bearing 20 supports the inside surface of belt 50 when sheaves 8 and 10 are spread apart to their maximum open position (not shown).

Figure 7:
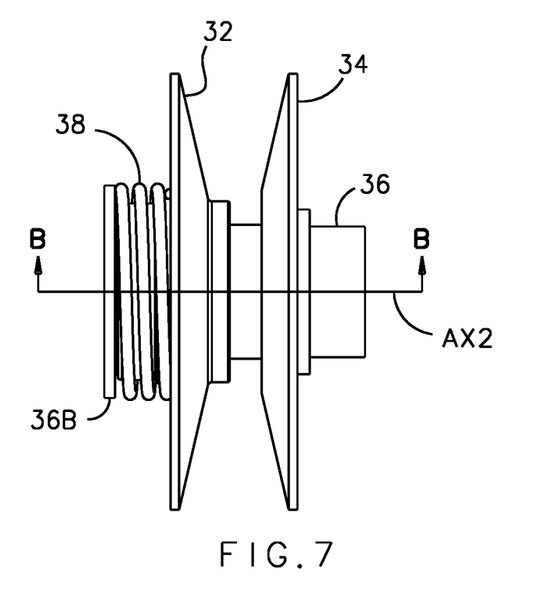
FIG. 7 is a side view of an exemplary embodiment of driver clutch mechanism.
Figure 8:
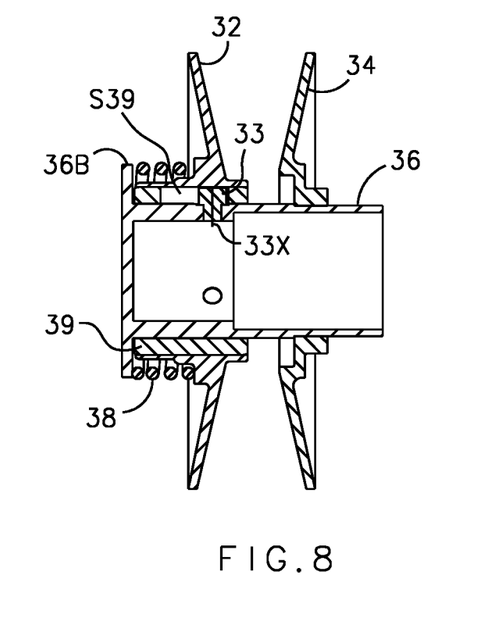
FIG. 8 is a section view of driven clutch mechanism from FIG. 7 taken along line B-B.
Figure 9:
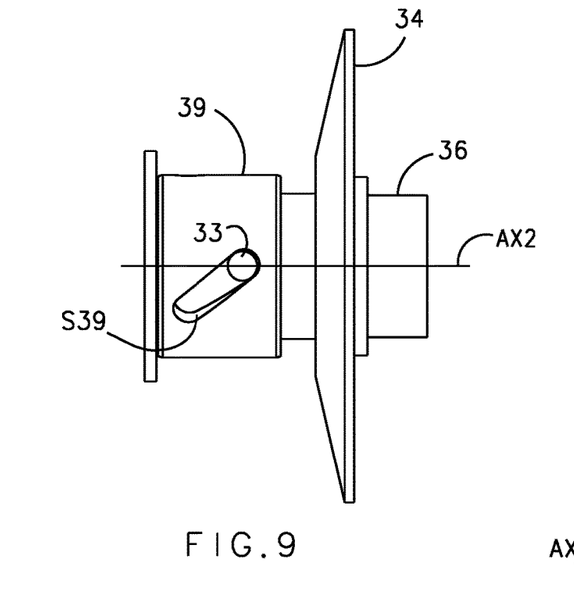
FIG. 9 is a side view of an exemplary embodiment of the driven clutch mechanism not including the movable sheave or the spring.

As shown if FIG. 7 and FIG. 8, driven clutch 200 comprises an output shaft 36, a fixed sheave 34 fixedly attached to shaft 36, in some embodiments, this may be accomplished by utilizing a press fit, a sheave 39 movably journaled to shaft 36, a round pin 33 rotatably journaled to a hole in shaft 36 with its upper portion loosely engaging slot S39 that is formed in driven sleeve 39.

In some embodiments, a compression spring 38 is slidingly journaled over the stem of the movable sheave 32. One end of spring 38 pushes sheave 32 towards fixed first driven sheave 32 while the other end of spring 38 rests against flange 36B formed at the end of shaft 36. Shaft 36, fixed first driven sheave 34, movable second driven sheave 32, driven sleeve 39, and pins 33 may be made of steel alloys, however, in some embodiments, these components may be manufactured from other metals such as but not limited to aluminum alloys titanium alloys; polymers such as but not limited to ABS or HDPE; or composite materials, such as but not limited to carbon fiber reinforced composites. In some embodiments, the CVT Cam system may include three pins 33 spaced 120 degrees apart. In other embodiments, more pins may be used to transmit higher torque.

As shown in FIG. 1 and in FIG. 3, the actuator mechanism 300 may include an actuator motor 40, an actuator arm 42 fixedly attached to output shaft 43 of actuator motor. One end of the actuator arm 42 may be rotatably journaled with link 44. The other end of link 44 may be rotatably journaled with carrier 16. Actuator motor 40 may be fixedly attached to housing or case 46 by bolts 48 or other fastening systems, such as but not limited to press-fit pins, rivets, or the like. In some embodiments it may be beneficial for the carrier to be a driver carrier and in others a driven carrier. The bearing may be a thrust bearing, roller bearing, needle bearing or the like.

Figure 14:
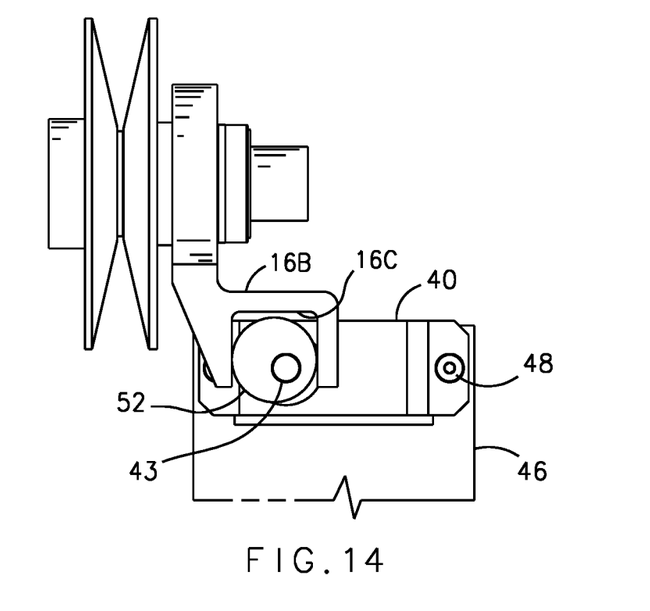
FIG. 14 is a side view of the driver clutch with another embodiment of actuating mechanism.
Figure 15:
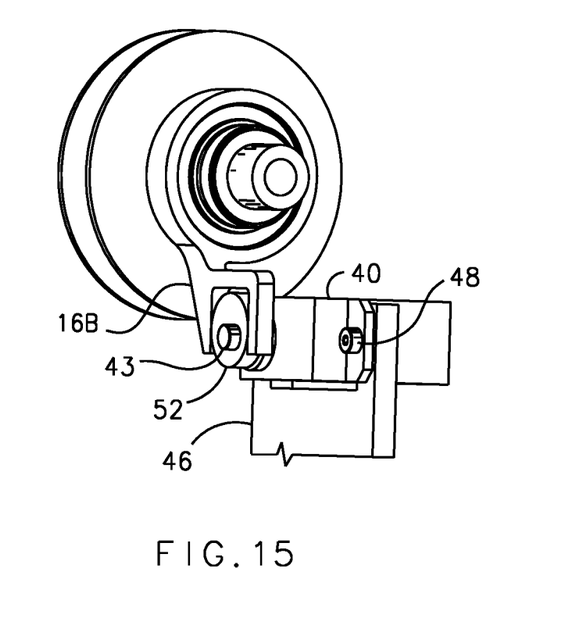
FIG. 15 is a rear isometric view of the driver clutch shown in FIG. 14.

FIG. 14 and FIG. 15 show another embodiment of the actuator mechanism which comprises a cam or eccenter 52 rigidly attached to the actuator motor output shaft 43. Eccenter 52 is cooperating with sides of cavity 16C formed in carrier 16B. In another embodiment the actuator mechanism may include a lead screw for force multiplication. In some embodiments of the cam-controlled continuously variable transmission system, the actuator may be engaged with the carrier by an eccenter, wherein the eccenter is rigidly attached to an output shaft of the actuator and cooperatively engaged with the carrier. The eccenter may be a cam in some embodiments. In some embodiments of the cam-controlled continuously variable transmission system, the actuator may include a screw for force multiplication. The actuator may also actuate the second driver sheave. The actuator may be configured to move the second driven sheave axially along the driven shaft.

As shown in FIG. 1 and FIG. 2, input power is delivered to driver clutch 100 via the driver shaft 2 that rotates in direction D1. Depending on the embodiment, input power may come from an internal combustion engine, an electric motor, hydraulic motor, a pneumatic motor, human power such as pedals or crank of a bicycle or other personal mobility system, or any type of input power delivered in a form of rotational motion. The driver shaft may be connected to any input power device including but not limited to an internal combustion engine, an electric motor, hydraulic motor, a pneumatic motor, human power such as pedals or crank of a bicycle or other personal mobility system, or any type of input power delivered in a form of rotational motion.

As shown in FIGS. 4, 5, and 6, at least one pin 12 is rotatably journaled in the holes of shaft 2 to exert force on the side of slot S4 formed in driver sleeve 4. One side of slot S4 may be oriented at an angle A1 to shaft axis AX1. A force FN1 is normal to a side of slot S4. Force FN1 distributes into axial force FX1 that pushes driver sleeve 4 and attached to it movable second driver sheave 10 towards belt 50 along axis AX1. Force FN1 also distributes into radial force FR1 that rotates driver sleeve 4 and attached to it second driver sheave 10 in direction D1. As a result belt 50 is compressed between fixed first driver sheave 8 and movable second driver sheave 10. The squeezing force allows friction on both sides of belt 50 to transmit torque to driven clutch 200 via belt force BF shown in FIG. 14.

Figure 12:
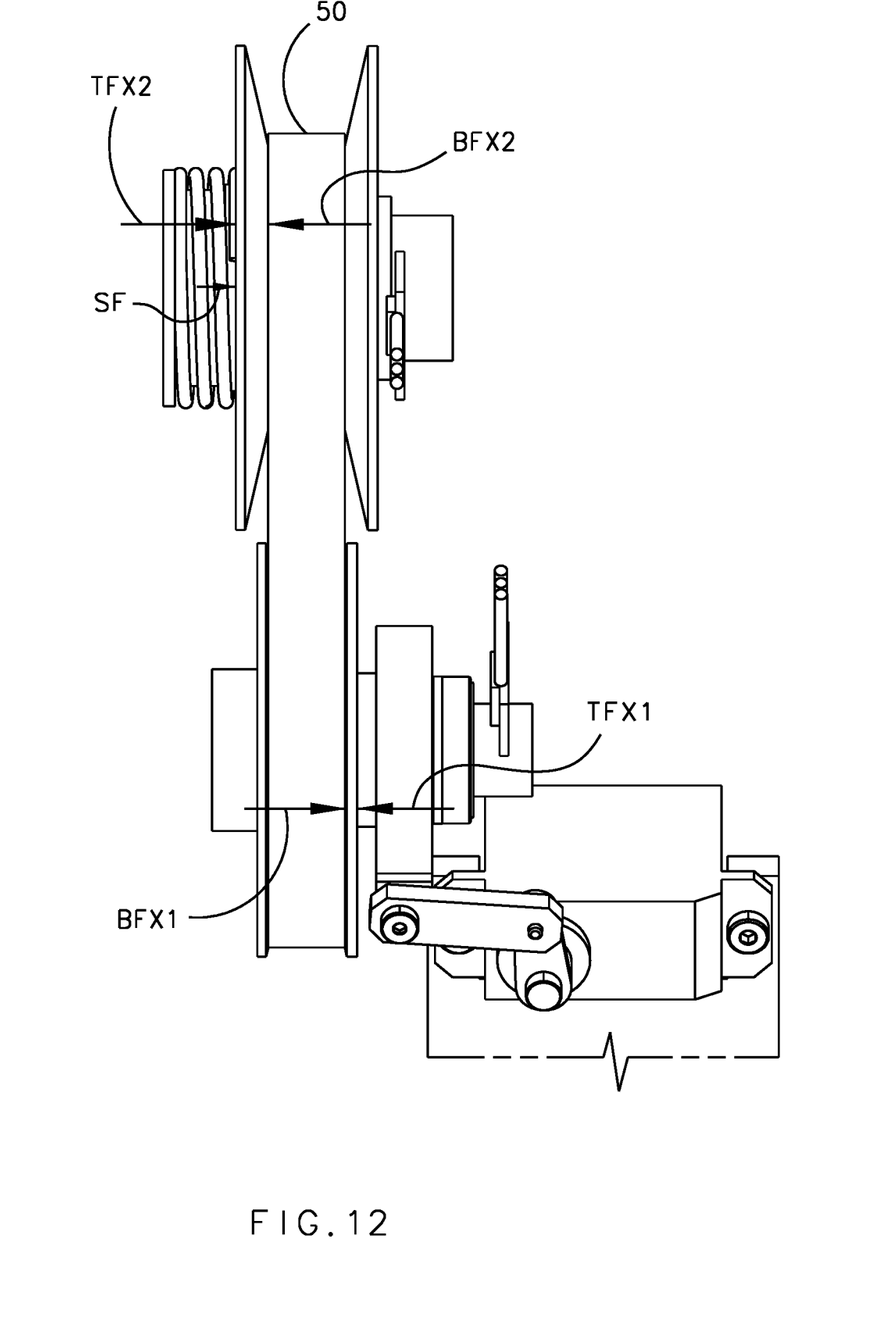
FIG. 12 is a side view of an exemplary embodiment of the cam-controlled continuously variable transmission system showing belt side forces and balancing forces.

The sum of all axial forces FX1 is designated TFX1 and is shown in FIG. 12. In some embodiments, the CVT cam system may comprises two slots S4 and two pins, with one pin in each slot, thus TFX1 in such an embodiment is:

$$TFX1 = 2 \times FX1$$

Figure 10:
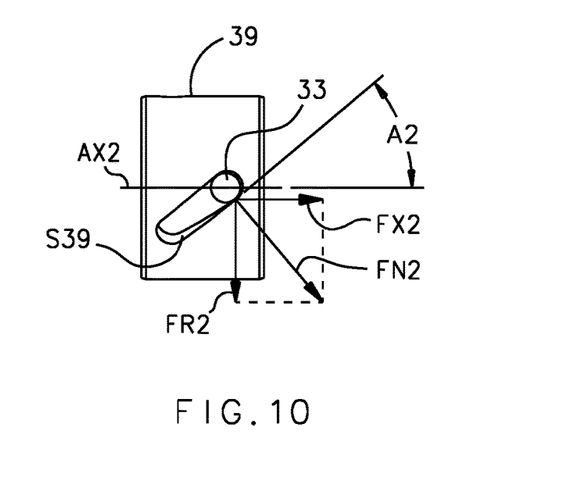
FIG. 10 is a side view of an exemplary embodiment of the sleeve with a slot and the pin of the driven clutch mechanism showing force distribution.
Figure 11:
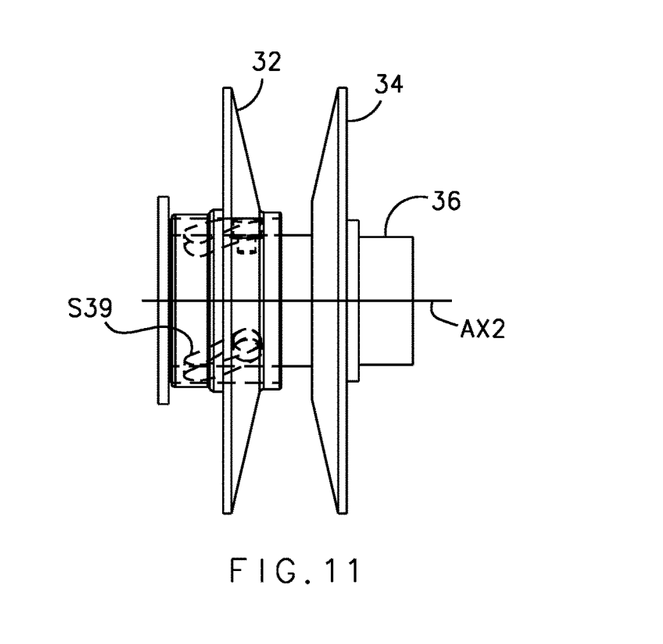
FIG. 11 is a side view of an exemplary embodiment of the driven clutch mechanism showing hidden slots by dashed lines.
Figure 13:
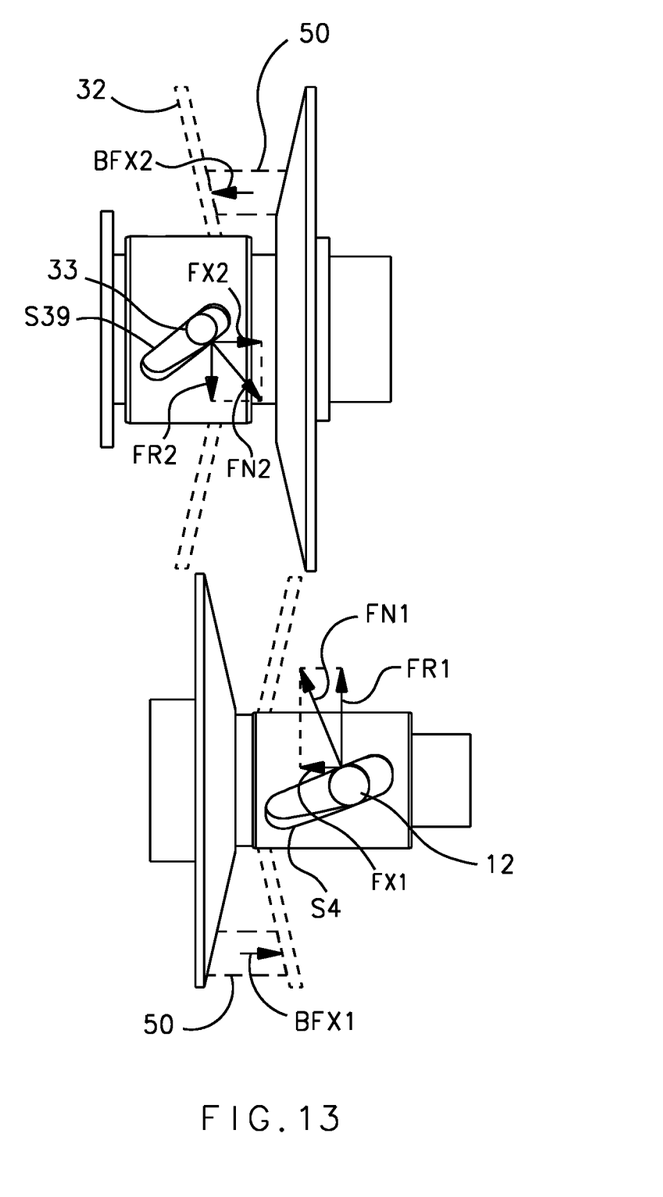
FIG. 13 is a side view of an exemplary embodiment of the cam-controlled continuously variable transmission showing force distribution acting on slots, with movable sheaves and belt shown by dashed lines.

AS shown in FIG. 2, FIG. 10, and FIG. 13, the belt force BF results in a normal force FN2. Force FN2 acts on a side surface of slot S39 as shown in FIG. 10. The side of slot S39 may be oriented at angle A2 to axis AX2. Force FN2 is a reaction force between pin 33 and the side of slot S39. Force FN2 distributes into axial force FX2 and into radial force FR2. The sum of all axial forces FX2 from all pins 33 is designated as TFX2 (shown in FIG. 12) which generates the majority of force that balances the axial belt force BFX2. Spring 38 pushes against second driven sheave 32 with spring force SF. The spring force SF adds to all the axial forces FX2 as shown in the equation below:

$$\Sigma FX2 = TFX2$$

$$TFX2 + SF = BFX2$$

The amount of force SF is small compared to the axial forces TFX2. In one embodiment the spring force SF may fluctuate between $\frac{1}{20}$ to $\frac{1}{10}$ of the force TFX2. In some embodiments, the function of spring 38 may be to assure maintained contact between the belt 50 and second driven sheave 32 and a the first driven sheave 34 before torque is applied to shaft 2 to enable the CVT system of the present invention to start transmitting torque without belt slip. Once torque is applied, axial forces generated on surface of slot S4 and on surface of slot S39 may be optimally proportional to torque and therefore adequate to transmit torque via belt 50 without belt slip. In one embodiment the spring 38 may be a coil-type spring, a torsion-type spring, a wave spring, or the like. In some embodiments of the cam-controlled continuously variable transmission system, the force applied by the actuator may generally coincide with the area of contact between the belt and the second driver sheave and the second driven sheave, thereby countering the force of the belt acting on the second driver sheave and the second driven sheave.

The contact radii between the belt and the sheaves in the driver and driven clutch changes in response to input from the actuator mechanism 300 causing the driven clutch to speed up or slow down in comparison to the driver clutch altering the speed ratio. Change of the contact radius between the belt and the sheaves is realized by moving the second driver sheave 10 along axis of rotation AX1. As shown in FIG. 3 and in FIG. 6, the second driver sheave 10 is moved axially by actuator mechanism 300. To accomplish this action, the arm 42 attaches to the motor shaft 43 and upon actuation alters the position of link 44 in response to rotation of the motor shaft 43. In some embodiments link 44 rotatably journaled with carrier 16 acts on the second driver sheave 10 via thrust bearing 14. In some embodiments, the actuator may be engaged with the carrier by a link rotatably journaled with the carrier.

As shown in FIG. 5 and FIG. 13, the force required from the actuator motor 40 to change axial position of the second driver sheave 10 is minimized by axial force FX1 generated on surface of slots S4. Angle A1 is such that the sum of forces S4 from all pins 12 generally balances axial belt force BFX1. This minimizes and optimizes the power requirement from the actuator motor 40 resulting in small size, weight and power draw by actuator motor 40. In some embodiments the actuator motor may be a stepper motor, servo motor, DC brushless motor, DC brushed motor, direct drive motor, or the like.

Figures 16, 17, 18, 19:
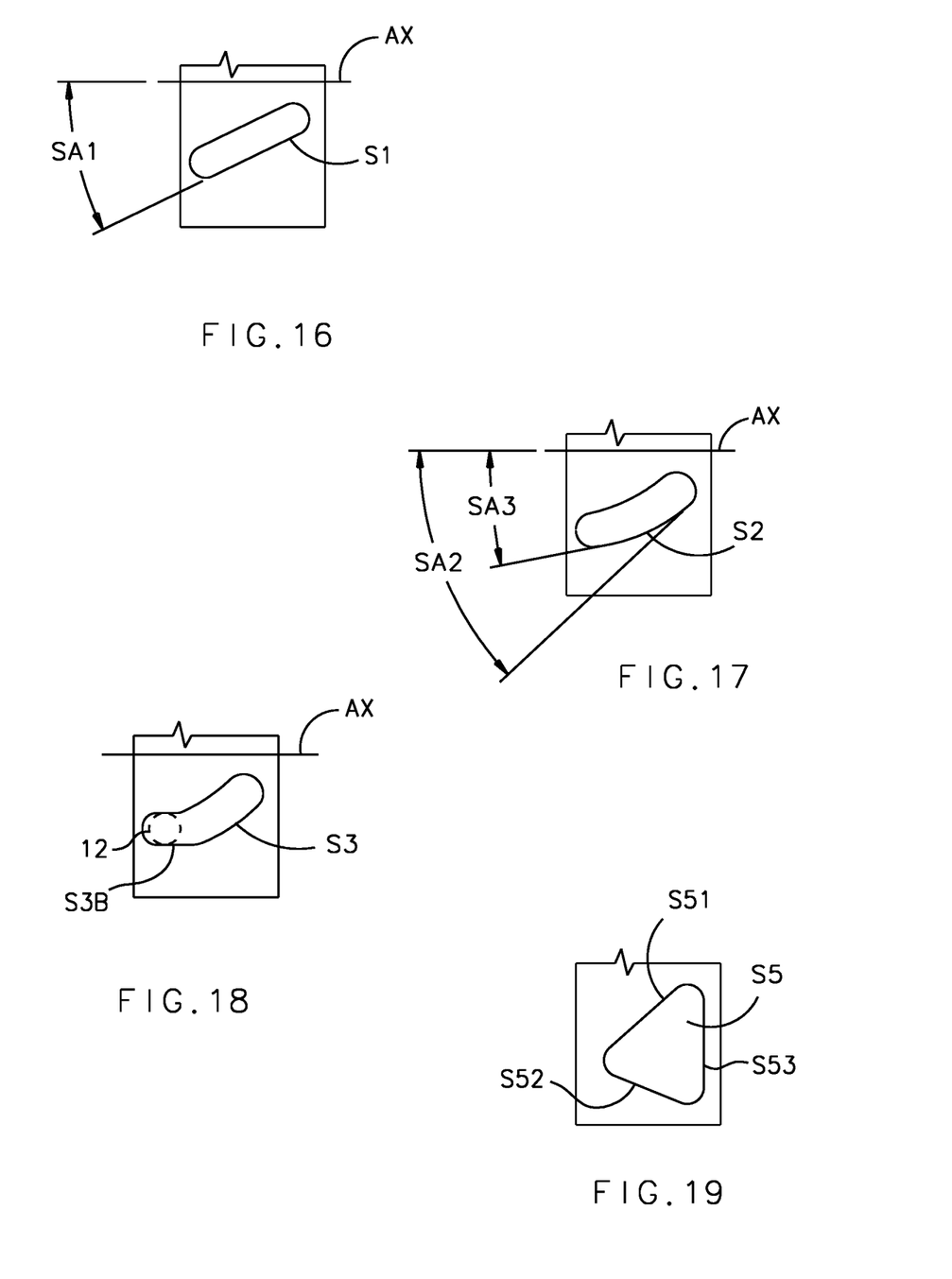
FIG. 16 is a partial unfolded view of a constant angle slot in driver clutch and in driven clutch of alternative embodiment of the cam-controlled continuously variable transmission system, unfolded at radius R.
FIG. 17 is a partial unfolded at radius R view of variable angle of slot in driver clutch and in driven clutch of an exemplary embodiment of the cam-controlled continuously variable transmission system.
FIG. 18 is a partial unfolded at radius R view of a slot of an alternative embodiment of the cam-controlled continuously variable transmission system.
FIG. 19 is a partial unfolded at radius R view of a slot of another alternative embodiment of the cam-controlled continuously variable transmission system.

In some embodiments angle A2 is such that the sum of forces FX2 generated on surface of slots S39 by all pins 33 generally balance axial belt force BFX2. FIGS. 16, 17, 18, 19, 20 and FIG. 22 show unfolded views of different embodiments of slot S4 and slot S39. The unfolded views are taken at radius R shown in FIG. 6. FIG. 16 shows an unfolded view of an alternative embodiment of a helical slot S1. Slot S1 is oriented at a constant angle SA1 to axis of rotation AX along its entire length. In some embodiments of the cam-controlled continuously variable transmission system, it may be beneficial to have the first portion or starting angle portion of the at least one driver slot that is parallel to axis of rotation.

In some embodiments of the cam-controlled continuously variable transmission system it may be beneficial for the driver slot angle and the driven slot angle to be constant. In others it may be beneficial for the driver slot angle and the driven slot angle to have a variable angle. In some embodiments the may be accomplished by having a starting angle in the driver clutch that is approximately 16 degrees at a first end of at least one driver slot and gradually increases to an angle in the range of 38 degrees at a second end of the at least one driver slot, and the starting slot angle in the at least one driven slot is in the range of generally 60 degrees at a first end and gradually decreases to an angle in the range of 35 degrees at a second end of the at least one driven slot.

In the majority of applications, the magnitude of axial force acting on the belt may depend on the radius at which the belt contacts the sheaves. If too much force is applied, it may result in undue stress on the CVT system and premature belt wear. If too little force is applied, it may result in belt slip followed by belt failure. FIG. 17 shows an unfolded view of the slot S2 of that helps to optimize the magnitude of axial forces. In some embodiments, slot S2 may have a variable angle along its length. At one end of said slot angle SA2 is larger than angle SA3 at the opposite end of the slot. Slot angle gradually changes along the length of slot S2 between angle S2 and S3. This results in the axial force FX1 in the driver clutch and the axial force FX2 in the driven clutch varying depending on the pin 12 and the pin 33 axial position inside slot.

In some embodiments, the angles of slots in driver clutch and slots in driven clutch are calculated to balance belt forces so as to result in optimum belt compression and stable operation of the CVT system. In one embodiment, the slot angle SA3 in the preliminary stage (driver clutch side) is approximately 16 degrees and slot angle SA2 is approximately 33 degrees. Slots in the driven clutch may have angle SA3 of approximately 60 degrees and slot angle SA2 of approximately 30 degrees. In some embodiments, the approximate angle range may be in the range of plus or minus 5 degrees from the stated value depending on the parameters to be optimized.

FIG. 18 shows unfolded view of another embodiment of slot designated as S3. Slot S3 has preferably variable angle along its length and a short portion S3B generally parallel to axes of rotation. When portion S3B cooperates with pin 12, no axial force is generated on surface of slot S3. This results with no axial force compressing belt, thus no belt force transmitted to driven clutch. This allows power source such as internal combustion engine to work at idle speed without transmitting torque to driven clutch. In yet another embodiment (not shown), slot S3 has short portion S3B generally parallel to axes of rotation and constant angle behind short portion S3B.

In yet another embodiment shown in FIG. 19, a slot S5 has a first side S51, a second side S52, and a side S53. Sides S51 and S52 are oriented at different angles to axis of rotation. Side S53 is generally perpendicular to axis of rotation. Slot side S52 engages pin during torque reversals such as during engine braking, allowing torque to be transmitted in opposite direction, that is from driven clutch to driver clutch.

Figure 20:
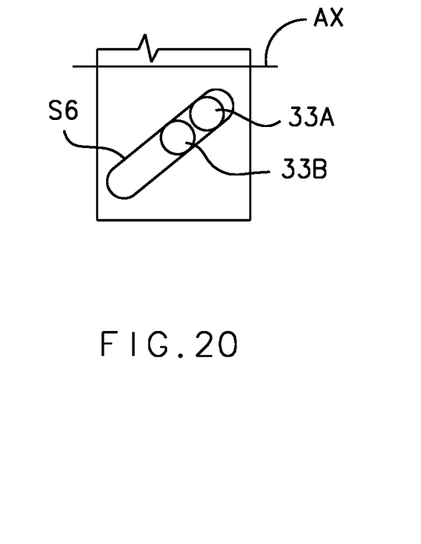
FIG. 20 is a partial unfolded at radius R view of a slot of an alternative embodiment of the cam-controlled continuously variable transmission system cooperating with two pins.

As shown in FIG. 20 of another embodiment, a pin 33A and a pin 33B cooperate with one slot S6. Consequently, load is distributed between two pins allowing larger load to be transmitted than when only one pin of the same size is cooperating with one slot. In some embodiments, the pin 12 and pin 33 may be either a driven or driver pin depending on the location of the pin in the system.

Figure 21:
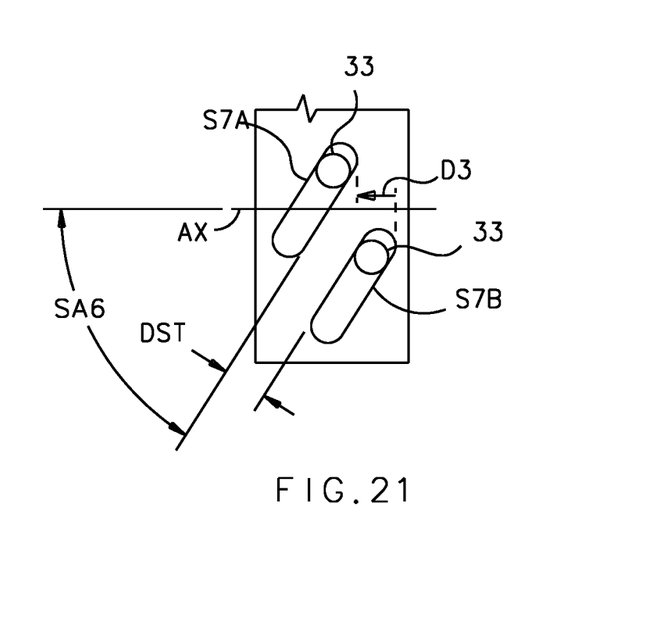
FIG. 21 is a partial unfolded at radius R view of slots of an alternative embodiment of the cam-controlled continuously variable transmission system that are angularly and axially spaced between each other.
Figure 22:
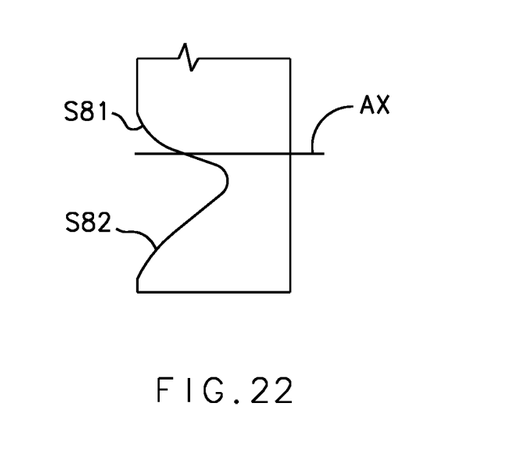
FIG. 22 is a partial unfolded at radius R view of a slot of an alternative embodiment of the cam-controlled continuously variable transmission system with one side of slot open.

In yet another embodiment shown in FIG. 21, slots are spaced from each other angularly and axially. A slot S7A is moved axially in a direction D3 vs slot S7B. Moving the slot position axially vs each other increases distance DST between slots, allowing for large slot angle SA7. In another embodiment shown in FIG. 22 one side of slot is open, having first side S81 of different angle than a second side S82. In another embodiment (not shown), actuator mechanism controls driven clutch. In yet another embodiment (not shown), driver clutch may include a spring. In some embodiments of the cam-controlled continuously variable transmission system, more than one pin may be cooperatively engaged with at least one driver slot and at least one driven slot. In some embodiments, the position of the at least one driver slot and at least one driven slot may be shifted axially in relation to each other. In others, the at least one driver slot and at least one driven slot may have sides not parallel to each. In yet another embodiment, at least one side of at least one driver slot and at least one driven slot are open.

In some embodiments a cam-controlled continuously variable transmission system may include but is not limited to a driver clutch, a driven clutch connected by a belt to said driver clutch, wherein the belt trained around the driver clutch and the driven clutch positioned between the first driver sheave, the second driver movable sheave, the first driven sheave, and the second driven movable sheave; an actuator engaged with a carrier, wherein the carrier is rotatably journaled with a bearing, wherein the bearing is rotatably journaled with the second driver sheave for axially displacing the second driver sheave, wherein the contact radii between belt and first and second driven and driver sheaves in the are changed in response to input from the actuator causing driven clutch speed up or slow down versus driver clutch in a controlled manner; at least one driver pin contacting the side of at least one driver slot optimizing force transmission from the belt; and at least one driven pin contacting the side of at least one driven slot optimizing force transmission from the belt. In some embodiments the driver clutch may include but is not limited to a driver shaft; a first driver sheave fixed to the driver shaft; a second driver sheave moveable parallel to an axis of rotation of the driver shaft; and the first driver sheave locked in a rotating relation with the first driver sheave by a member cooperatively engaged with a second driver sheave receiving member, the driver sleeve having at least one driver slot disposed at a driver slot angle with respect to the axis of rotation of the driver shaft. In some embodiments the driven clutch may include but is not limited to a driven shaft; a first driven sheave fixed to the shaft; a second driven sheave moveable parallel to an axis of rotation of the driven shaft; and the second driven sheave locked in rotating relation with the first driven sheave by a member cooperatively engaged with a second driven sheave receiving member, the driven sleeve having at least one driven slot disposed at a driven slot angle with respect to the axis of rotation.

From the foregoing, it will be appreciated that specific embodiments of the invention have been described herein for purposes of illustration, but that various modifications may be made without deviating from the scope of the invention. Features or elements from one embodiment may be used or exchanged with features or elements of another embodiment. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately" or "about." At the very least, and not as an attempt to limit the application of the doctrine of equivalents to the claims, each numerical parameter recited in the specification or claims which is modified by the term "approximately" or "about" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

The invention claimed is:

1. A cam-controlled continuously variable transmission system comprising:
   a driver clutch, wherein the driver clutch comprises:
      a driver shaft;
      a first driver sheave fixed to the driver shaft;
      a second driver sheave moveable parallel to an axis of rotation of the driver shaft;
      the second driver sheave locked in a rotating relation with the first driver sheave by a member cooperatively engaged with a second driver sheave receiving member, a driver sleeve, having at least one driver slot disposed at a driver slot angle with respect to the axis of rotation of the driver shaft, fixedly attached to the second driver sheave;
   a driven clutch connected by a belt to said driver clutch, wherein the belt trained around the driver clutch and the driven clutch positioned between the first driver sheave, the second driver movable sheave, a first driven sheave, and a second driven movable sheave,
   wherein the driven clutch comprises:
   a driven shaft;
      a first driven sheave fixed to the driven shaft;
      a second driven sheave moveable parallel to an axis of rotation of the driven shaft;
      the second driven sheave locked in rotating relation with the first driven sheave by a member cooperatively engaged with a second driven sheave receiving member, a driven sleeve, having at least one driven slot disposed at a driven slot angle with respect to the axis of rotation, fixedly attached to the second driven sheave;
   an actuator engaged with a carrier, wherein the carrier is rotatably journaled with a bearing, wherein the bearing is rotatably journaled with the second driver sheave for axially displacing the second driver sheave, wherein the contact radii between belt and first and second driven and driver sheaves are changed in response to input from the actuator causing driven clutch speed up or slow down versus driver clutch in a controlled manner;
   at least one driver pin contacting the side of at least one driver slot optimizing force transmission from the belt; and
   at least one driven pin contacting the side of at least one driven slot optimizing force transmission from the belt, wherein the starting angle in the driver clutch is approximately 16 degrees at a first end of at least one driver slot and gradually increases to an angle in the range of 38 degrees at a second end of the at least one driver slot, and the starting slot angle in the at least one driven slot is in the range of generally 60 degrees at a first end and gradually decreases to an angle in the range of 35 degrees at a second end of the at least one driven slot.

2. The cam-controlled continuously variable transmission system of claim 1, wherein the carrier is a driver carrier.

3. The cam-controlled continuously variable transmission system of claim 1, wherein the bearing is a thrust bearing.

4. The cam-controlled continuously variable transmission system of claim 1, wherein the actuator actuates the second driver sheave.

5. The cam-controlled continuously variable transmission system of claim 1, wherein the force applied by the actuator generally coincides with the area of contact between the belt and the second driver sheave and the second driven sheave, thereby countering the force of the belt acting on the second driver sheave and the second driven sheave.

6. The cam-controlled continuously variable transmission system of claim 1, wherein the position of the at least one driver slot and at least one driven slot are shifted axially in relation to each other.

7. The cam-controlled continuously variable transmission system of claim 1, wherein at least one side of at least one driver slot and at least one driven slot is open.

* * * * *